United States Patent [19]
Kondo et al.

[11] Patent Number: 5,673,118
[45] Date of Patent: Sep. 30, 1997

[54] COMMUNICATION APPARATUS AND METHOD WITH MEANS TO CONTROL RECALL AND OTHER COMMUNICATION OPERATIONS

[75] Inventors: Masaya Kondo, Yokohama; Seishi Ejiri, Kawasaki; Soichi Yamamuro, Tokyo; Takekazu Kumagai, Yokohama; Takeshi Tsukamoto, Kawasaki; Kazuomi Oishi, Yokohama; Masaru Saruwatari; Masaki Toyama, both of Kawasaki, all of Japan

[73] Assignee: Canon Kabushiki Kaisha, Tokyo, Japan

[21] Appl. No.: 657,078

[22] Filed: Jun. 3, 1996

[30] Foreign Application Priority Data

Jun. 20, 1995 [JP] Japan .................. 7-153328

[51] Int. Cl.⁶ .................. H04N 1/32; H04N 1/327
[52] U.S. Cl. .................. 358/437; 358/442; 358/468
[58] Field of Search .................. 358/468, 434, 358/435, 436, 437, 438, 439, 442; 379/100

[56] References Cited

U.S. PATENT DOCUMENTS 5,479,500  12/1995  Matsuzaki et al. .............. 379/100

FOREIGN PATENT DOCUMENTS

| 62-216474 | 9/1987 | Japan | H04N 1/32 |
| 62-269536 | 11/1987 | Japan | H04N 1/00 |
| 63-62468 | 3/1988 | Japan | H04N 1/32 |
| 4-230167 | 8/1992 | Japan | H04N 1/32 |

*Primary Examiner*—Scott A. Rogers
*Attorney, Agent, or Firm*—Fitzpatrick, Cella, Harper & Scinto

[57] ABSTRACT

A communication apparatus has a calling function and is connectable to an external information-processing terminal. In response to a communication request input from the operation unit or a communication request from the external information-processing terminal, the communication apparatus performs a calling operation for facsimile communication to a receiving end. When the apparatus cannot communicate with the receiving end that was called, it carries out a recalling operation in response to a communication request from the operation unit, but does not perform the recalling operation to a communication request from the information-processing terminal.

8 Claims, 6 Drawing Sheets

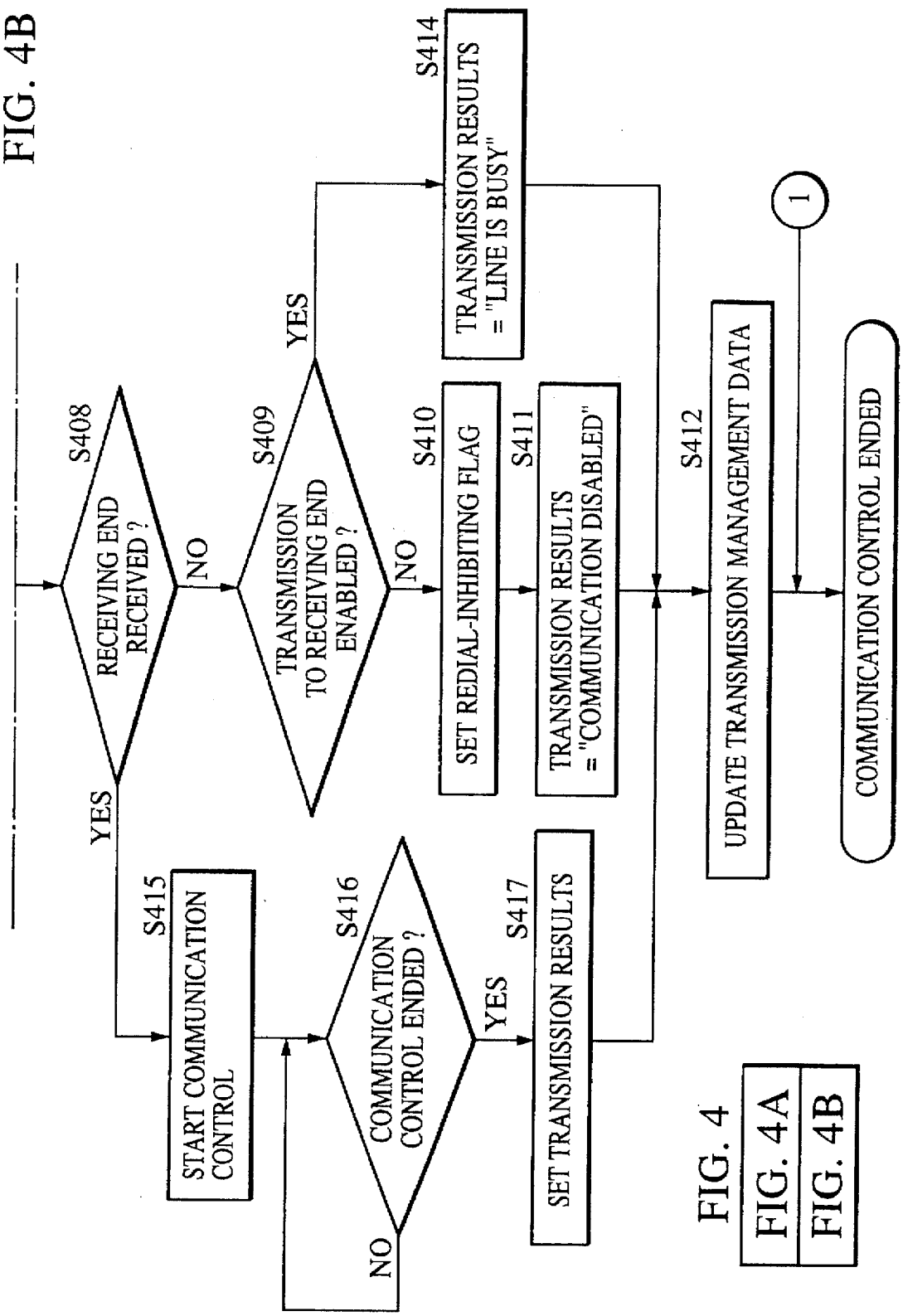

FIG. 5

| 501 | 502 | 503 | 504 | 505 | 506 | 507 | 508 | 509 |
|---|---|---|---|---|---|---|---|---|
| COMMUNICATION NUMBER | FILE NUMBER | TELEPHONE NUMBER OF RECEIVING END | CALLING NUMBER | START TIME | FINAL ACCESS TIME | COMMUNICATION RESULTS | COMMUNICATION MODE | FLAG |
| 0004 | 0001 | 03 3456 7890 | 34567890 | 05/05 12:12 | 05/05 12:15 | OK | TX | OFF |
| 0005 | 0002 | 0120 345678 | 0120345678 | 05/05 15:10 | 05/05 15:20 | NG | TX | ON |
| 0006 | 5001 | 415 223 3445 | | 05/06 00:10 | 05/06 00:21 | OK | RX | OFF |
| | | | | | | | | |

COMMUNICATION APPARATUS AND METHOD WITH MEANS TO CONTROL RECALL AND OTHER COMMUNICATION OPERATIONS

BACKGROUND OF THE INVENTION

1. Field of the Invention

The present invention relates to a communication apparatus that is provided with a calling function and can be connected to external information-processing terminals.

2. Description of the Related Art

Hitherto, as an example of the above type of communication apparatus, a facsimile machine having an interface for connecting information-processing terminals (computers, facsimile servers and so on) to the machine is known. In this type of communication apparatus, the following two methods are available for performing communication control over communication requests made from information-processing terminals.

In the first method, when a communication request is made from an information-processing terminal, the facsimile machine accepts the request and receives the telephone number of a receiving end and the communication data from the terminal. Thereafter, the facsimile machine dials the telephone number and achieves transmission under its own control in a manner similar to an ordinary transmitting operation.

In the second method, on the other hand, when a communication request is made from an information-processing terminal, the facsimile machine leaves communication control to the information-processing terminal and thereafter performs transmission control according to instructions from the terminal.

The first method, however, encounters the following problem. The facsimile machine performs communication control without distinguishing communication requests made from information-processing terminals from communication requests from the operational unit of the facsimile machine (ordinary transmission). Accordingly, the information-processing terminal is unable to set, for example, a redialing interval to any desired interval.

Although in the second method the information-processing terminal is able to set a desired redialing interval and so on, it presents the following problem. If the terminal sets the desired redialing interval without considering the standards of a telephone network, a redialing process which violates the standards of the telephone network may be executed. For example, in compliance with the standards of the telephone network, the redialing interval may be required to be not less than a predetermined time (in Japan, a maximum of two attempts to call within three minutes is allowed), or automatic redialing may be prohibited if the receiving end is not a facsimile machine (in France).

SUMMARY OF THE INVENTION

Accordingly, in view of the above problems, it is an object of the present invention to provide an improvement in a communication apparatus.

It is another object of the present invention to provide a communication apparatus that does not execute a recalling operation in response to a communication request made from an external information-processing terminal.

It is still another object of the present invention to provide a communication apparatus that first determines whether a communication request made from an external information-processing terminal corresponds to a recalling operation which does not satisfy recalling conditions for a communication network connected to the terminal, and then judges whether the request can be accepted according to the above determination.

Further objects, features and advantages of the present invention will become apparent from the following description of the preferred embodiments with reference to the attached drawings.

BRIEF DESCRIPTION OF THE DRAWINGS

FIGS. 4A and 4B together illustrate a flow chart of transmission control exercised by the facsimile machine according to this embodiment; and FIG. 5 illustrates communication results data.

DETAILED DESCRIPTION OF THE PREFERRED EMBODIMENTS

An embodiment of the present invention will now be described in detail with reference to the drawings. In the following embodiment, a facsimile machine will be used as a communication apparatus by way of example.

Figure 1:
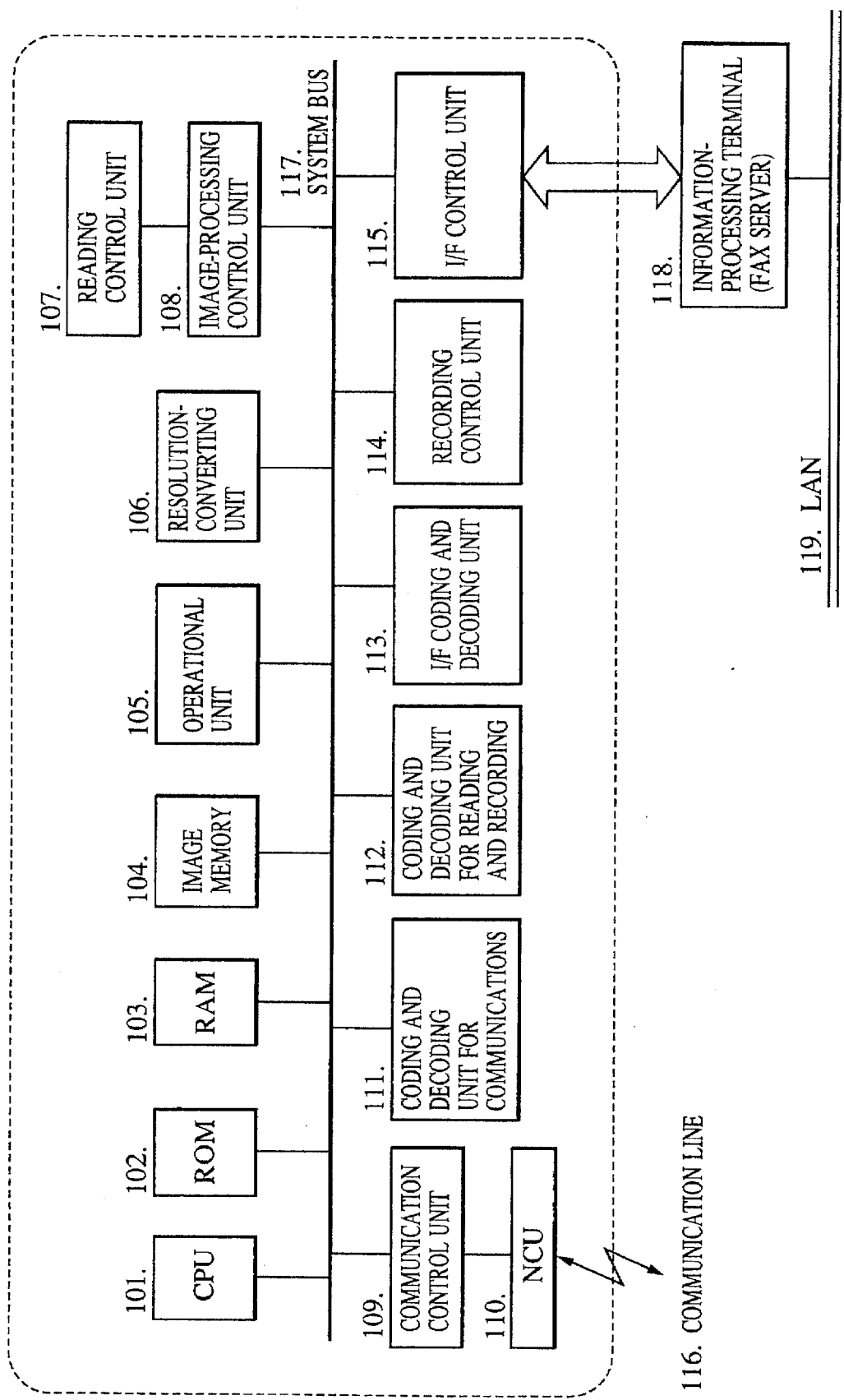
FIG. 1 is a block diagram of the construction of a facsimile machine according to an embodiment of the present invention.

FIG. 1 is a block diagram of the construction of a facsimile machine of this embodiment. A CPU 101 is a system controlling unit that controls the overall image-processing apparatus via a system bus 117. A ROM 102 is used to store programs, such as control programs of the CPU 101 and an operating system (OS) program. A RAM 103, being comprised of an SRAM or the like, is primarily used to store program control variables and so on, and also stores values set by the operator and management data of the communication apparatus, and contains various work buffers. An image memory 104 is formed of a RAM or the like to store image data. In this embodiment, software control, such as scheduling, task switching, etc., is exercised over the control programs stored in the ROM 102 under the control of the OS which is also stored in the ROM 102.

An operational unit 105, which is comprised of various keys, an LED, an LCD and so on, displays various input operations performed by the operator and the status of the operations of the image-processing apparatus. A reading control unit 107, formed of a contact image sensor (CS image sensor), a document-feed mechanism and the like, optically reads a document with the use of the CS image sensor and converts it to electrical image data. Then, an image-processing control unit 108 executes various types of image processing, such as binary processing and intermediate processing, on the electrical image data and outputs it as high-definition image data. The converted image data is then coded in a coding and decoding control unit 112 for image reading and recording according to a predetermined coding method, and is then stored in the image memory 104.

A recording control unit 114, being comprised of a page printer, a recording-image processing control unit, etc., executes various types of image processing, such as smoothing, recording-density corrections and so on, on the recording image data decoded in the coding and decoding control unit 112 with the use of its recording-image processing control unit. In this manner, the recording control unit 114 converts the recording image data to high-definition image data and outputs it to the page printer.

A communication control unit 109, which is formed of a modulator-demodulator (MODEM), performs modulating and demodulating control over transmitting and receiving signals of the facsimile machine. A network control unit (NCU) 110 transmits a selection signal (a dial pulse or a dial tone) to an analog communication line of e.g., the Public Standard Telephone Network (PSTN) 116, and detects call signals so as to execute line control, such as automatic receiving control and so on. The image data stored in the image memory 104 is decoded in a coding and decoding unit 111 used for achieving communications and is subjected to resolution conversion per millimeter or per inch, enlargement/reduction processing, etc., in a resolution converter 106. The resulting image is controlled to be transmitted in such a manner that it is decoded in the communication coding and decoding unit 111 according to the capacity of the receiving end.

An interface (I/F) controller 115 performs interface control to connect the facsimile machine with an information processing terminal (FAX server) 118 connected to the exterior. In this embodiment, the I/F controller 115 corresponds to a parallel interface, for example, the directional Centronics Interface. The FAX server 118 is connected to a local area network (LAN) 119 to receive remote-control requests, such as transmission, printing and so on, from information-processing terminals (clients) on the LAN. The FAX server 118 performs remote-control operations, such as transmission, printing, data registration, etc., on the facsimile machine by transmitting predetermined commands, parameters, data, etc., to the image-processing apparatus via the I/F controller 115. It should be noted that, in this embodiment, application software and driver software for controlling the remote-control operations and remote-control operation requests are installed in the FAX server 118.

Figure 2:
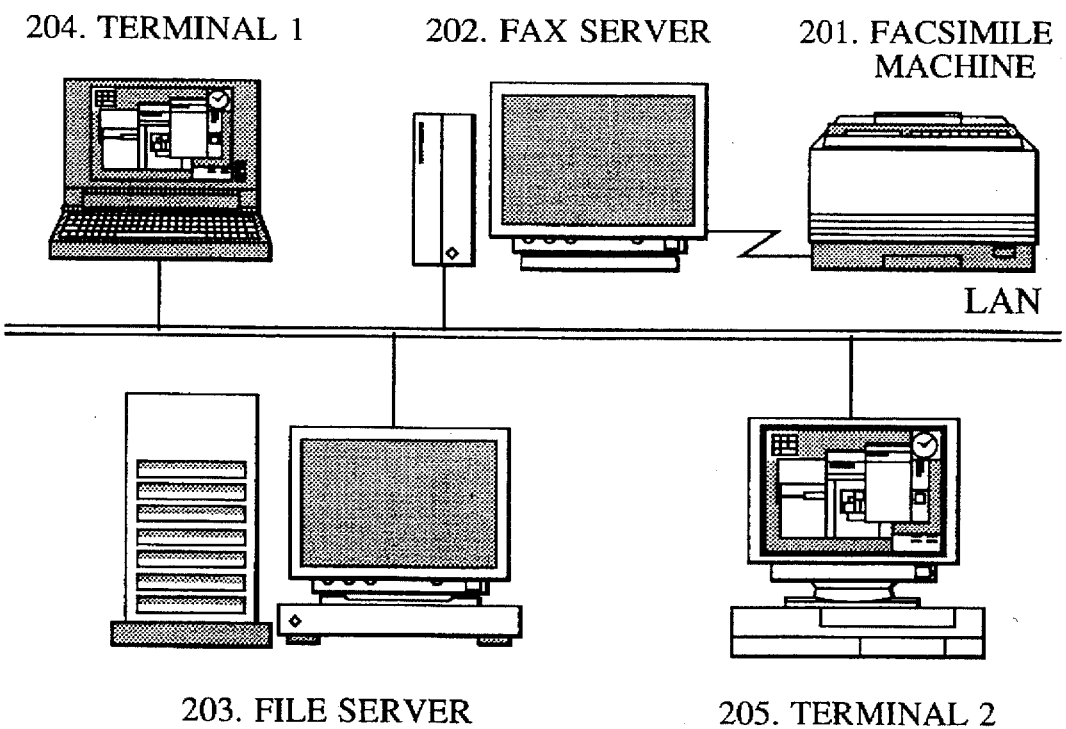
FIG. 2 illustrates the system of a LAN (Local Area Network) of this embodiment.

FIG. 2 illustrates the system of the LAN 119 used for this embodiment. The LAN 119 includes a facsimile machine 201 (FIG. 1) of this embodiment, a FAX server 202, a file server 203 and client machines 204 and 205 (terminals 1 and 2) connected to the LAN 119. The FAX server 202 receives requests, such as facsimile transmission and printing, from the information-processing terminals on the LAN and executes control, such as remote operations and the like, over the facsimile machine 201 connected to the server 202. The file server 203 executes control such as protocol management and file management on the LAN 119.

Control is executed over facsimile transmission in this embodiment in the following manner. The terminal 1 (204) logs in to the FAX server 202 and makes a request, such as for facsimile transmission, to the server 202. In response to this request, the FAX server 202 adjusts the scheduling and starts to perform automatic remote-control operations over the facsimile machine 201.

An explanation will now be given of the remote-control operation of facsimile communications between the FAX server 202 and the facsimile machine 201 with reference to FIG. 3.

Figure 3:
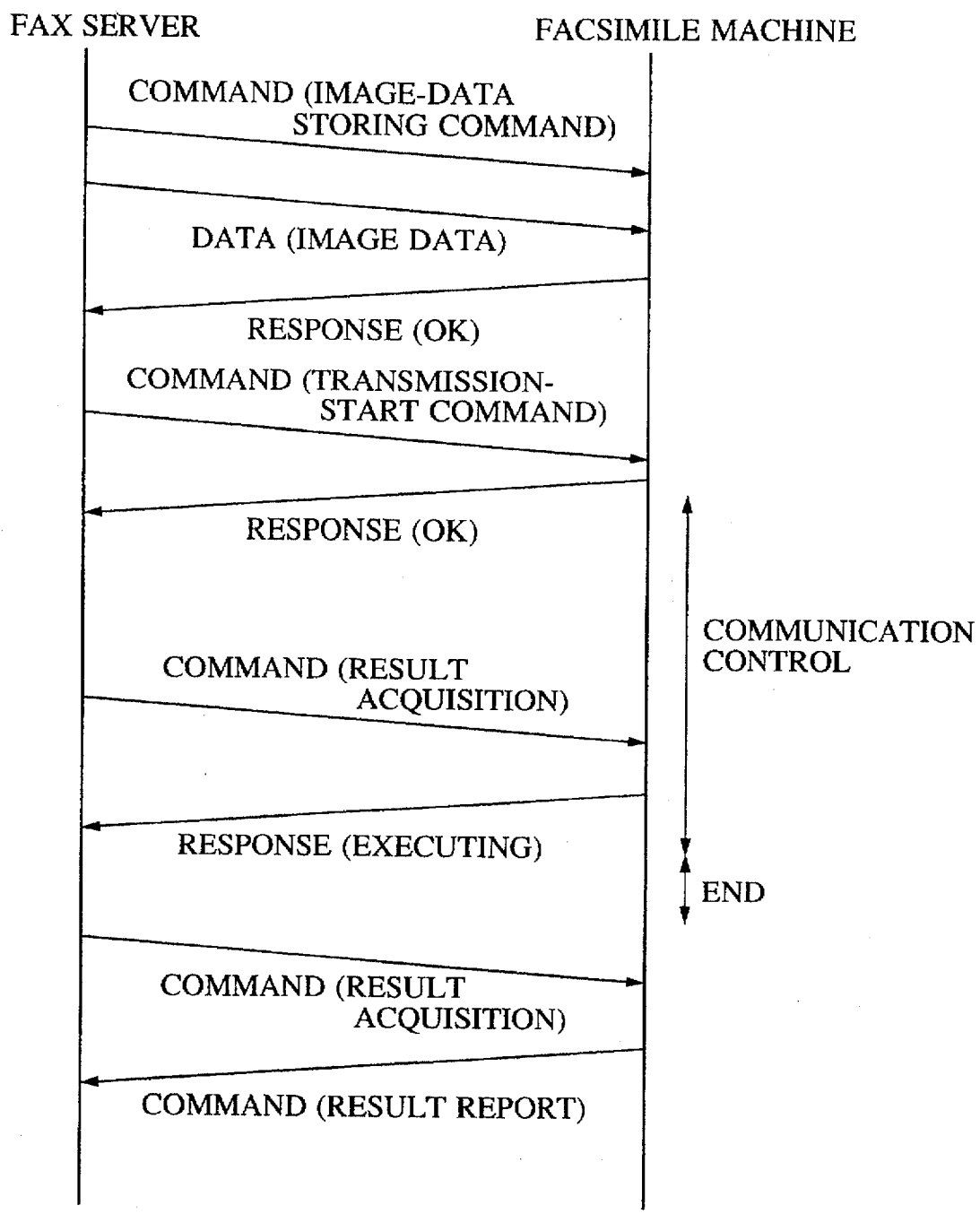
FIG. 3 illustrates the data transmitting and receiving status between an information-processing terminal and a facsimile machine according to this embodiment.

FIG. 3 schematically illustrates the data transmitting and receiving status between the information-processing terminal 118 and the I/F controller 115. Remote control can be achieved from the FAX server 202 to the facsimile machine 201 by transmitting and receiving commands, image data and responses of each operation according to a predetermined interface protocol. The commands include command codes for identifying various commands, set values required for executing various commands (recording paper size, telephone number of the receiving end, type of image data, etc.) and so on. The image data is transmitted or received in response to the command for requesting the image data or the command for transferring the image data, respectively.

The facsimile-communication remote control operations performed in this embodiment can be divided into three types: image-data storing control for storing the image data to be transmitted in the image memory 104 of the facsimile machine (image-data storing command); transmission request control for requesting the start of transmission to the receiving end (transmission-start command); and transmission-results acquisition control for reporting the results of transmission control executed by the facsimile machine (transmission-results acquisition command). The image-data storing command includes information on the resolution of image data to be stored, the image size and so on. The transmission-start command contains information required for transmission, such as the telephone number of the receiving end, the communication mode, etc. The transmission-results acquisition command is used to inform the FAX server of the transmission results as a response, including detailed information on errors, obtained by communication control exercised according to the transmission-start command.

Figure 4A:
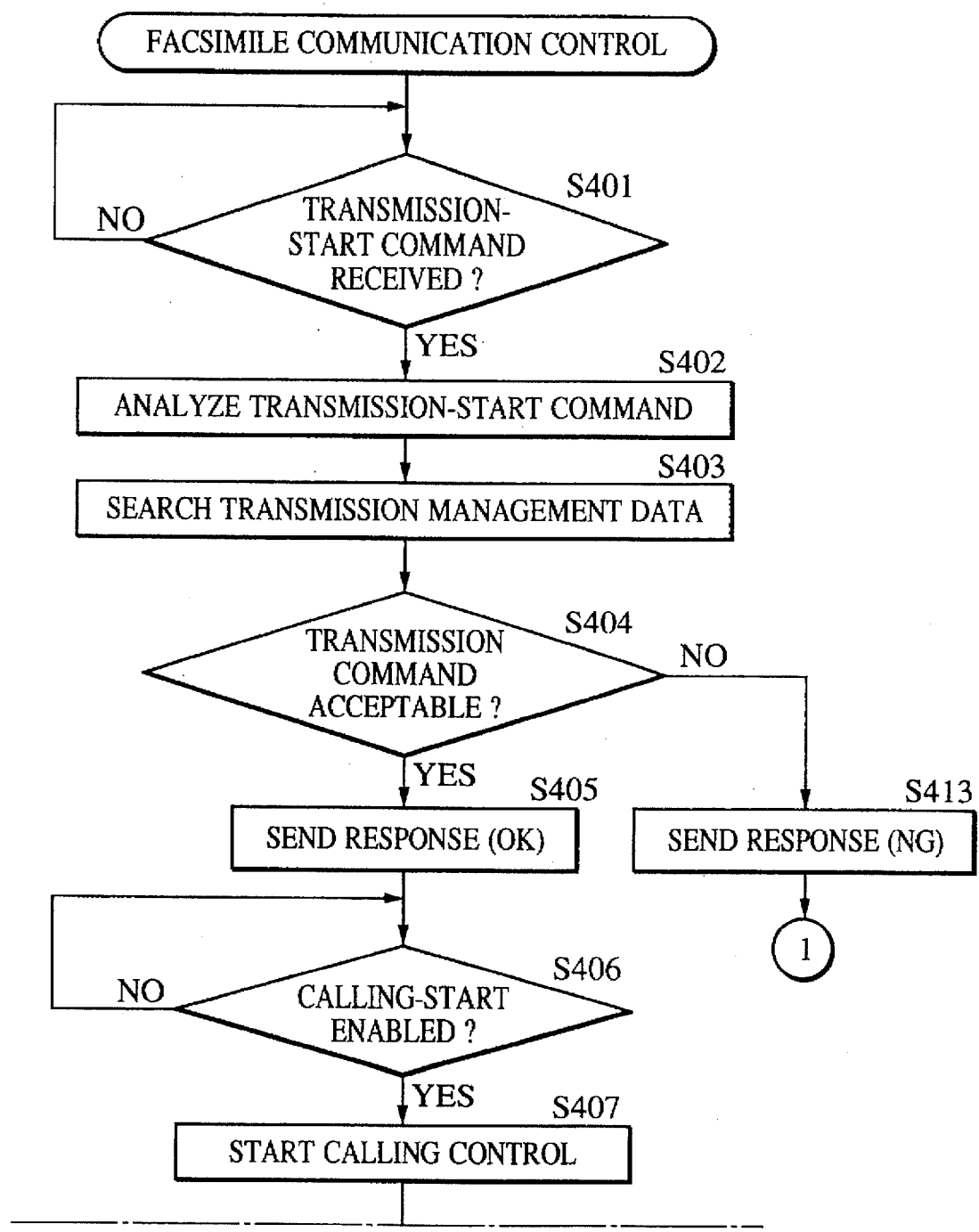

An explanation will now be given, with reference to FIGS. 4A and 4B, of transmission control exercised by the facsimile machine in response to the transmission request made by the FAX server. It is first monitored whether the transmission-start command from the FAX server has been received (S401). If the answer in S401 is yes, control is performed to carry out an analysis of the command (S402) and, more specifically, information added to the command, such as the telephone number of the receiving end and the communication mode, is analyzed and is converted to a data form suitable for communication control by the facsimile machine. The resulting data is then set. The communication management data is searched according to the telephone number of the receiving end analyzed in S402 (S403). The communication management data in this embodiment comprises the telephone number of a receiving end, the final access time, and a redial-inhibiting flag which is set when facsimile communications cannot be achieved with the receiving end because of erroneous dialing or other reasons.

FIG. 5 illustrates an example of the configuration of the communication management data in this embodiment. The communication number 501 and the file number 502 are provided for differentiating between the communications and between the types of image data stored in the image memory, respectively. The telephone number of the receiving end 503, which is data located on the communication protocol (TSI/CSI frame of ITU-T T. 30), is indicated on the communication-results report or the like. The calling number 504 is an item for storing the number which has been actually dialed. In this embodiment, the calling number 104 is employed to retrieve the telephone number of the receiving end. The calling number 504 is effective only when transmission control (calling) is performed. The transmission start time 505 indicates the time when the communication is started, and the final access time 506 represents the time when the communication is ended (including when the communication is ended because of errors). Redialing-interval determining control in this embodiment is performed utilizing the final access time 506. The communication results 507 indicates whether transmission has been correctly performed, and the communication mode 508 is an item for storing the communication mode which has been actually used for the communications, both items being indicated in the communication report. The redial-inhibiting flag 509 is set when communications are made to receiving ends other than facsimile machines (when facsimile signals are not received).

Returning to FIG. 4A, after the communication management data is searched in S403, it is determined whether the transmission command is acceptable (S404). In this embodiment, a determination is made in the following manner. When the telephone number of the receiving end cannot be found in the communication management data, the transmission-start command is unconditionally accepted. On the other hand, if the telephone number can be found in the communication management data, a calculation is made of a time T representing the difference between the present time and the final access time of the corresponding communication management data in order to limit a redialing interval to not less than a predetermined duration, i.e., a duration equivalent to a redialing interval set in the circuit switching network connected to the communication equipment. The time T is then compared to a command acceptable time Ta which has been stored in the RAM 103 of the facsimile machine. If the time T is not less than the command acceptable time Ta, i.e., $T \geq Ta$, the transmission start-command is accepted.

The calling interval in this embodiment is controlled by the above-described difference time T, the command acceptable time Ta and the calling interval Tb. The calling interval Tb is defined as the interval of transmitting (calling) a selection signal from the facsimile machine to the communication line 116. The command acceptable time Ta is provided to enable the transmission-start command to be accepted even though the difference time T is less than the calling interval Tb in order to improve the system efficiency of the facsimile machine.

If it is determined in S404 that the calling interval is too short to accept the transmission-start command, an NG command is sent to the FAX server as a response (S413), and the transmission control is terminated without updating the transmission management data. If it is determined in S404 that the transmission-start command is acceptable, the above-described difference time T between the present time and the final access time is updated and compared with the calling interval Tb so that the calling interval Tb can be monitored. When the calling interval reaches a predetermined time, calling control is started over the communication line 116 (S407).

After the start of calling control, it is monitored whether the receiving end has accepted the transmission (FIG. 4B; S408). If there is any response from the receiving end to the facsimile calling signal, the flow proceeds to S415 in which communication control is started. Upon the start of the communication control, it is monitored whether the transmission control is ended (S416). When the facsimile transmission with the receiving end is correctly ended or erroneously ended, the transmission control is terminated. Afterwards, the communication results are stored as transmission results (S417), and the telephone number of the receiving end and the final access time in the transmission management data are updated (S412). Control is then ended. In this embodiment, the transmission results are reported as a response to the transmission-results acquisition command from the FAX server.

If facsimile transmission cannot be performed in S408, a query is made whether the receiving end is capable of receiving transmission (S409). In this embodiment, a signal on the communication line is detected, whereby a determination can be made, such as "the line of the receiving end is busy" (when a busy tone is detected) or "the receiving end is not a facsimile machine" (when a ring back tone is first detected and then a facsimile signal is detected). If it is detected in S409 that the line of the receiving end is busy, "the line is busy" is stored as the transmission result (S414), and the transmission management data is updated (S412). Control is then terminated. On the other hand, if it is detected in S409 that the receiving end is not a facsimile machine, it is determined that facsimile transmission has failed because dialing has not been correctly performed. In this case, when the same telephone number as the calling number of the receiving end is set by the transmission-start command, a redial-inhibiting flag for rejecting the command is set (S410). Further, "communication disabled" is stored as the transmission result (S411), and the transmission management data is updated (S412). Control is then terminated. Thereafter, the flow returns to S401 in which the transmission-start command is again monitored.

In the foregoing embodiment, the communication management data is updated and the calling interval is controlled only when a transmission request command from the FAX server is accepted. This is not exclusive, and transmission control can be exercised by the operational unit of the facsimile machine through the use of single button dialing or a ten-key numerical pad, as well as from the FAX server, so as to control the monitoring of the calling interval and the updating of the communication management data. This enables more reliable control over the calling interval. When transmission control is performed by the operational unit, automatic redialing control can be achieved, and thus the above-described control is necessary only at the start of transmission control and the end of dialing control.

Also, in the above-described embodiment, transmission control is exercised to monitor the calling interval and to update the communication management data. However, this is not exclusive, and the above monitoring and updating may be exercised during polling transmission control, for example.

Further, although in this embodiment the calling interval is controlled by the present time and the final access time, it may be controlled by setting the calling start enable time at the end of transmission control. Additionally, although the calling interval is controlled by a predetermined fixed value, the present invention is not limited thereto. For example, the calling interval may be specified by the FAX server. Alternatively, the calling interval may be modified if the line of the receiving end is busy or there is no response from the receiving end (the receiving end has not received the call).

As will be clearly understood from the foregoing description, the present invention offers the following advantages. The communication apparatus is adapted not to itself execute a recalling operation when a communication is requested from an information-processing terminal. As a consequence, communication scheduling and so on can be performed by the information-processing terminal alone. Moreover, it is determined whether calling in response to a communication request from an information-processing terminal corresponds to a recalling operation that does not satisfy a predetermined recalling condition. Upon this determination, it is judged whether the communication request can be accepted, thereby preventing the transmission of a call deviating from the standards.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:

operation means for inputting a first communication request;

interface means connectable to an information processing terminal for receiving a second communication request therefrom;

calling means for performing a calling operation to a receiving end; and control means for controlling said communication apparatus in a selected one of a plurality of communication operations in response to each of the first and second communication requests, the plurality of communication operations including a recalling operation wherein said control means causes said calling means to recall a receiving end that had been called in a prior communication operation that was not fully performed, wherein said control means selects a communication operation other than the recalling operation for controlling said communication apparatus in response to the second communication request.

2. A communication apparatus comprising:

operation means for inputting a first communication request;

interface means connectable to an information processing terminal for receiving a second communication request therefrom;

calling means for performing a calling operation to a receiving end; and control means for controlling said communication apparatus in a selected one of a plurality of communication operations in response to each of the first and second communication requests, the plurality of communication operations including a recalling operation wherein said control means causes said calling means to recall a receiving end that had been called in a prior communication operation that was not fully performed, wherein said control means selects a communication operation other than the recalling operation for controlling said communication apparatus in response to the second communication request, and wherein each of the first and second communication requests includes information identifying a respective receiving end and requests a calling operation to the respective receiving end, and wherein said control means is responsive to the second communication request to make a determination whether or not the requested calling operation is equivalent to a recalling operation that fails to satisfy a predetermined recalling condition, said control means refusing the second communication request when the requested calling operation corresponds to that recalling operation.

3. An apparatus according to claim 2, further comprising storage means for storing, for each communication operation, communication result information identifying the respective receiving end, wherein, in response to the second communication request, said control means reads, from the storage means, communication result information for a most recent communication to the receiving end identified in the second communication request and makes the determination based on the read-out communication result information.

4. An apparatus according to claim 3, further comprising identifying means for, in response to the second communication request, providing an identification result identifying whether or not the receiving end identified in the second communication request is a predetermined type of communication equipment, wherein said storage means stores the identification result in accordance with the respective receiving end, and wherein said control means accepts or rejects the second communication request based on the identification result.

5. A method of controlling a communication apparatus having an interface connectable to an information processing terminal, said method comprising the steps of:

inputting a first communication request;

receiving a second communication request from the information processing terminal through the interface;

performing a calling operation to a receiving end; and controlling the communication apparatus in a selected one of a plurality of communication operations in response to each of the first and second communication requests, the plurality of communication operations including a recalling operation wherein said control step causes said performing step to recall a receiving end that had been called in a prior communication operation that was not fully performed, wherein said control step selects a communication operation other than the recalling operation for controlling the communication apparatus in response to the second communication request.

6. A method of controlling a communication apparatus having an interface connectable to an information processing terminal, said method comprising the steps of:

inputting a first communication request;

receiving a second communication request from the information processing terminal through the interface;

performing a calling operation to the receiving end; and controlling the communication apparatus in a selected one of a plurality of communication operations in response to each of the first and second communication requests, the plurality of communication operations including a recalling operation wherein said control step causes said performing step to recall a receiving end that has been called in a prior communication operation that was not fully performed, wherein said control step selects a communication operation other than the recalling operation for controlling the communication apparatus in response to the second communication request, and wherein each of the first and second communication requests includes information identifying a respective receiving end and requests a calling operation to the respective receiving end, and wherein said control step is responsive to the second communication request to make a determination whether or not the requested calling operation is equivalent to a recalling operation that fails to satisfy a predetermined recalling condition, said control step refusing the second communication request when the requested calling operation corresponds to that recalling operation.

7. A method according to claim 6, further comprising a storage step for storing, for each communication operation, communication result information identifying the respective receiving end, wherein, in response to the second communication request, said control step reads, from information stored in said storage step, communication result information for a most recent communication to the receiving end identified in the second communication request and makes the determination based on the read-out communication result information.

8. A method according to claim 7, further comprising an identifying step for, in response to the second communication request, providing an identification result identifying whether or not the receiving end identified in the second communication request is a predetermined type of communication equipment, wherein said storage step stores the identification result in accordance with the respective receiving end, and wherein said control step accepts or rejects the second communication request based on the identification result.

* * * * *